United States Patent [19]
Walker et al.

[11] Patent Number: 6,061,643
[45] Date of Patent: May 9, 2000

[54] METHOD FOR DEFINING DURABLE DATA FOR REGRESSION TESTING

[75] Inventors: Jeffrey L. Walker, Ross; Samer Diab, Fremont; Adam Slovik, San Francisco, all of Calif.

[73] Assignee: TenFold Corporation, Draper, Utah

[21] Appl. No.: 09/111,049

[22] Filed: Jul. 7, 1998

[51] Int. Cl.$^7$ ................................................. G06F 11/263
[52] U.S. Cl. ........................ 702/123; 714/33; 714/37; 714/38; 714/45
[58] Field of Search ............... 702/123; 714/33, 714/36, 38, 37, 41, 45

[56] References Cited

U.S. PATENT DOCUMENTS

| | | | |
|---|---|---|---|
| 5,673,387 | 9/1997 | Chen et al. | 395/183.14 |
| 5,758,062 | 5/1998 | McMahon et al. | 395/183.14 |

Primary Examiner—Marc S. Hoff
Assistant Examiner—Hien Vo
Attorney, Agent, or Firm—Kirton & McConkie; Michael F. Krieger

[57] ABSTRACT

A method and computer product for facilitating regression testing during the development and other life cycle phases of a software application comprised of transactions. A regression test is comprised of test cases containing test data describing the target test at a functional or behavioral level. A test operator may perform a manual test and simultaneously record the test. The architecture of the invention monitors the physical activity of the test operator and thereafter transforms the physical event steps into functional or behavioral test data. The test data is in a robust functional description of the transaction such that physical modifications to the transaction during software development preserve the viability of the test data for execution in the modified transaction. A test report may also be generated in response to the execution of a regression test. The test report lists both the test data executed and the response thereto. A test report may be compared with baseline or control test report to verify the lack of regression of the transaction. A difference report may also be generated from the comparison of test reports.

20 Claims, 8 Drawing Sheets

| VIEW | FIELD | SAMPLE VALUES |
|---|---|---|
| ORDERS | CUSTOMER NAME | IBM, COMPAQ |
| | ORDER NUMBER | 56530, 12010 |
| | ORDER DATE | 12/1/96, 12/2/96 |

16

```
# THIS TEST CASE ADDS AN ORDER, RE-QUIERS IT TO MAKE A
# CHANGE, QUERIES IT AGAIN, AND THEN ERASES IT.
# FINALLY, IT TRIES TO QUERY IT ONE MORE TIME TO ENSURE
# THAT IT ERASED SUCCESSFULLY. AFTER THE QUERY FAILS, IT
# CLOSES THE TRANSACTION.
$TESTCASE$TESTORDERS, ORDERS
001,ADD,IBM,56530,12/1/96
002,QUERY,,56530
003,MODIFY,,,12/2/96
004,QUERY,,56530
005,ERASE
006,QUERY,,56530
```

| | | | |
|---|---|---|---|
| ENTER ORDER | 001 | 001 | ORDERS, 1, ADD, IBM, 56530, 12/1/96, INTERNAL |
| ENTER ORDER | 001 | 002 | MENU ORDERS (80) |
| ENTER ORDER | 001 | 003 | ENTER ORDERS |
| ENTER ORDER | 001 | 004 | CUSTOMER |
| ENTER ORDER | 001 | 005 | CUSTOMER NAME" |
| ENTER ORDER | 001 | 006 | CUSTOMER NUMBER" |
| ENTER ORDER | 001 | 007 | ORDER DATE" |
| ENTER ORDER | 001 | 008 | ORDER TYPE |
| ENTER ORDER | 001 | 009 | RADIO BUTTON 'INTERNAL' (OFF) |
| ENTER ORDER | 001 | 010 | RADIO BUTTON 'EXTERNAL' (OFF) |
| ENTER ORDER | 001 | 011 | BUTTON 'QUERY' |
| ENTER ORDER | 001 | 012 | BUTTON 'CANCEL' |
| ENTER ORDER | 001 | 013 | ENTER, CUSTOMER, IBM |
| ENTER ORDER | 001 | 014 | ENTER, ORDER, NUMBER, 56530 |
| ENTER ORDER | 001 | 015 | ENTER, ORDER DATE, 12/1/96 |
| ENTER ORDER | 001 | 016 | ENTER, ORDER TYPE, EXTERNAL |
| ENTER ORDER | 001 | 017 | CUSTOMER NAME" -> 'IBM' |
| ENTER ORDER | 001 | 018 | ORDER NUMBER" -> '56530' |
| ENTER ORDER | 001 | 019 | ORDER DATE" -> '12/1/96' |
| ENTER ORDER | 001 | 020 | ORDER TYPE |
| ENTER ORDER | 001 | 021 | RADIO BUTTON 'EXTERNAL' -> (ON) |
| ENTER ORDER | 001 | 022 | CLICK DONE |
| ENTER ORDER | 001 | 023 | CLICK CANCEL |

FIG. 5

August 8, 1997              AutoCompare Differences Report                Page 1
                                         between
               Current Test Results and Approved Test Results AutoCompare ignored
   Leading Spaces, Trailing Spaces, Embedded Spaces,
   Different Case, Blank Lines Current Test Results differs from Approved Test Results because:

Has: Enter Order 001 005      Order Date '12/1/1996'
Not: Enter Order 001 005      Order Date "
Missing: Enter Order 001 017     Order Date "
Extra: Enter Order 001 018       Order Number " .-> '56530'
                                 Customer Name " .-> 'IBM'

FIG. 6

```
$SIGNON$,USERNAME,PASSWORD,RESPONSIBILITY
$DATAMAKER$,ON-LINE,ORDERS,10000,RANDOM
ORDERS:COMPANY NAME=1,CHOOSE,IBM,EXXON,GENERAL MOTORS
    ORDER TYPE=,SMARTPICK
    ORDER DATE=,DATE,1/1/1995,12/12/1996
    ORDER STATUS=,LITERAL,OPEN
    SALES REPRESENTITIVE=SMARTPICK
    CURRENCY=,LITERAL,USD
    SPLIT SHIPMENTS=,LITERAL,NO
    DATE SUBMITTED=,COPYFIELD,ORDER DATE
ORDERLINES:LINE NUMBER=0-5,SEQUENCE,1
    CATALOG PART=,SMARTPICK
    COMPANY PART=,SMARTPICK
    QUANTITY=,NUMBER,100,10000
    UNIT PRICE=,NUMBER,500,1500
SHIPMENTS:REQUIRED SHIP DATE=,COPYFIELD,ORDER DATE
    SHIPMENT QUANTITY=,COPYFIELD,QUANTITY
    SCHEDULED SHIP DATE=,COPYFIELD,ORDER DATE
```

FIG. 7A

| VIEW | FIELD | DATA THAT DATA MAKER CREATES |
|---|---|---|
| ORDERS | COMPANY NAME | PUT ONE OF THE VALUES IBM, EXXON, OR GENERAL MOTORS IN EACH INSTANCE. |
| | ORDER TYPE | PICK A VALUE FROM THE FIELD'S SMARTPICK. |
| | ORDER DATE | RANDOMLY PICKS A DATE BETWEEN 1/1/95 AND 12/12/96. |
| | ORDER STATUS | SETS TO OPEN IN EVERY INSTANCE. |
| | SALES REPRESENTATIVE | PICKS A VALUE FROM THE FIELD'S SMARTPICK. |
| | CURRENCY | SETS TO USD IN EVERY INSTANCE. |
| | SPLIT SHIPMENTS | SETS TO NO IN EVERY INSTANCE. |
| | DATE SUBMITTED | USES THE SAME VALUE AS THE ORDER DATE FIELD FOR EACH INSTANCE. |
| ORDER LINES | LINE NUMBER | FOR EACH ORDER, STARTS AT 1 FOR THE FIRST LINE AND ADDS 1 FOR EACH SUBSEQUENT LINE. |
| | CATALOG PART | PICKS A VALUE FROM THE FIELD'S SMARTPICK. |
| | COMPANY PART | PICKS A VALUE FROM THE FIELD'S SMARTPICK. |
| | QUANTITY | RANDOMLY PICKS A NUMBER BETWEEN 100 AND 10,000. |
| | UNIT PRICE | RANDOMLY PICKS A NUMBER BETWEEN 500 AND 1,500. |
| SHIPMENTS | REQUESTED SHIP DATE | USES THE SAME VALUE AS THE ORDER DATE FIELD FOR EACH INSTANCE. |
| | SHIPMENT QUANTITY | USES THE SAME VALUE AS THE QUANTITY FIELD FOR EACH INSTANCE. |
| | SCHEDULED SHIP DATE | USES THE SAME VALUE AS THE ORDER DATE FIELD FOR EACH INSTANCE. |

FIG. 7B

METHOD FOR DEFINING DURABLE DATA FOR REGRESSION TESTING

BACKGROUND OF THE INVENTION

1. The Field of the Invention

The present invention relates to computer programming, and more particularly to regression testing of computer software from the development through maintenance phases.

2. Present State of the Art

Complex, mission-critical business applications typically contain large numbers of on-line transactions, each of which consists of considerable functionality. Software application quality largely depends on extensive testing of the functionality of each of the on-line transactions to ensure completeness and correctness. Software developers recognize that testing of application software is an ongoing or continuous process that can be integrated into every phase of the application software life cycle including the design phase, development phase, unit testing phase, systems testing and integration phase, quality assurance phase, customer installation and support phases as well as the application maintenance phase.

Present industry trends dictate that approximately eight hours are required to thoroughly test an application transaction if the individual performing the test both understands the transaction and has data available for testing. Therefore, if an application contains 500 transactions, such an application would require approximately 4,000 hours to comprehensively test the applications transactions, if there are no errors present. Furthermore, in order to properly test an application, when an error is discovered and fixed, the entire test must be reperformed precisely in the same manner using the same data to ensure that the repair for the discovered error did not inadvertently introduce another error into the application.

Additional shortcomings are also present in the traditional manners in which software applications have been tested. For example, due to the large number of hours required for properly testing the transactions of an application, dedicated testing staff have generally been required. It is both impractical and expensive to dedicate large numbers of staff to perform such manual testing processes. Furthermore, in order to properly test software application transactions, it is important to capture product content knowledge, usually best appreciated by the transaction designer, for use in selecting test data. To do so ensures a more robust testing of application transactions. However, to transfer such knowledge and skill from the originating entity, such as the transaction designer, to a transaction tester requires additional time and resources for such a knowledge transfer. Additionally, manual testing of application transactions by humans may inject additional errors such as the disregarding of a test sequence or the inadvertent overlooking of test results. Furthermore, one of the more overriding issues in software transaction testing occurs when changes are made to transactions thereby obsoleting a substantial portion of the test information.

Traditional automated application testing strategies have only been partially successful in minimizing the manual nature of transaction testing. For example, one type of automated application testing employs a keystroke-capture technique (FIG. 1) wherein the computer memorizes the keystroke and mouse movements performed by the test operator enabling the computer to replay the test at a later time for retesting the application. Such keystroke-capture techniques fall short for many reasons. For example, keystroke-capture techniques rely on the graphical user interface design thereby precluding testing of transactions prior to the implementation of the graphical user interface. That is to say, for testing strategies employing keystroke-capture techniques any changes, even subtle changes, to the graphical nature of the transactions renders the prior tests unusable. Furthermore, the test data generated by a keystroke-capture technique is normally unmaintainable and incomprehensible, and therefore, any changes to the test data require the re-creation of the test to enable the entire test to be re-recorded for subsequent playback.

Additionally, keystroke-capture testing techniques typically do not generate output but rather sequentially execute the transaction undergoing test. Therefore, to evaluate the behavior of the test, a test operator must physically observe the test being executed to verify the results. Furthermore, such keystroke-capture techniques yet introduce the human error aspect into transaction testing as the test operator is required to observe and visually verify the integrity of the test. Finally, keystroke-capture testing techniques are difficult and even impossible to document and verify as hard copies of test data are unavailable, or are at least incomprehensible as they are a series of cryptic graphical commands addressed to the graphical user interface of the application undergoing testing.

Preparation of test data is yet another shortcoming of traditional automated testing techniques. Presently, there does not exist an acceptable way to develop test data for traditional testing methods except by using traditional manual techniques for developing such tests. Furthermore, once test data is developed, maintaining such test data is virtually impossible as it has a manually developed origin. Therefore, application programmers have heretofore invented or created non-meaningful data that often does not actually properly exercise the transaction or application undergoing the testing process. While present testing strategies are lacking in proper discipline, the tools and strategies necessary for improving testing methods and strategies have heretofore been nonexistent.

While present industry trends such as the heterogeneity of computer architectures and communication standards exacerbate the testing discipline, other modem trends such as the low-cost and increased speed of computer resources facilitate the economical implementation of an advanced application testing philosophy. Thus, what is needed is a method for enabling robust test data to be created such that changes to the transaction whether during the design, maintenance or other phase do not render the test data unusable or obsolete. What is yet needed is a method for representing the test results in a report that is both comprehensible and comprehendible that enables efficient regression testing of a transaction throughout its life cycle.

SUMMARY AND OBJECTS OF THE INVENTION

The foregoing problems in the prior state of the art have been successfully overcome by the present invention, which is directed to a method for regression testing a transaction in a software application using a test case comprised of test data wherein the test data describes the regression test at a functional or behavior level and executes the regression test at a physical level and further wherein changes to the transaction do not result in unusable test data.

It is an object of the present invention to provide a method for generating test data for use in a regression test wherein the test data is described at a functional level such that physical changes or edits to a transaction do not render the test data obsolete.

It is a further object of the present invention to provide a method for regression testing a transaction using a test case comprised of test data described at a functional level such that the test data remains usable for testing a transaction from the design and development phases through the installation and maintenance phases of the software application.

It is yet a further object of the present invention to provide a regression test methodology wherein a report generated by a regression test contains information that is comprehensible and valid for the test data posed to the transaction under test.

It is another object of the present invention to provide an automated method of providing regression testing wherein a test report generated by a test run may be compared to a control test report exhibiting test results accepted as a baseline performance of the transaction.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a method and computer program product for regression testing a transaction using a test case comprised of test data wherein the test data describes the regression test at a functional or behavioral level and executes a regression test at a physical level is provided.

Development of a software application is traditionally an evolutionary process through which an application designer initially generates a first cut or version of a software application and thereafter modifies and revises the application to meet consumer demands or functionality requirements. Such an evolutionary process requires that software be tested at various phases in the development process. While change is inevitable in the underlying transactions of the software application, a software developer would desire to not recreate transaction test code to be compatible with variations or physical modifications to a transaction.

Furthermore, the transaction designer also desires to establish a baseline such that subsequent modifications to other transactions within a software application may be tracked and verified to assure they do not inject aberrant behavior into the application. Such performance tracking is commonly known as regression testing wherein the application is rigorously and periodically tested to verify that the performance is not regressing from a former state. In order to facilitate a testing-friendly environment, the present invention provides for an analysis of the physical underlying test sequence for the transaction with the conversion of the test sequence to a functional description which is thereafter stored as the executable test case. The storing of such functional level test data provides a robust descriptive layer that typically remains static through the development and other various processes through which a software application passes. For example, in the development of a specific transaction for editing a database, a transaction designer may place specific data fields within a frame at locations preferable to the transaction designer and consistent with a transaction designer's prior experiences. However, during a subsequent evaluation phase such as at the time of demonstration of the transaction to the customer, the customer may request a different configuration of the transaction fields within the displayed frame. The present invention freely accommodates the physical manipulations and changes associated with the transaction evolution without resulting in the wholesale scrapping of the test data.

In the present invention, a transaction may be designed having a particular field with yes/no alternatives implemented as a radio group wherein one button would be a "yes" button and a second button would be a "no" button. When a regression test is developed, the testing technology would note that during the execution of a test, the yes button was selected. Rather than just storing in the test sequence an X/Y coordinate of the mouse click position, the present invention converts the selection of the radio group into a functional description wherein the information stored consists of the selection of a yes for a particular field. Thereafter, when physical changes to the transaction occur such as the changing of the field from a radio group to a plain text entry field, such a change does not impact the ability of the present invention to execute the regression test. During run time of the regression test on the physically modified transaction, the testing technology of the present invention notes that in the prior test for the specific field being tested, the response was that of a yes since the test definition was stored at a functional level rather than the physical level storing of prior art implementations of specific X/Y coordinates. Therefore, the investment in a regression test for the transaction in its original state is preserved and may be reused on the transaction in its physically modified state without requiring the test case to be re-recorded.

Therefore, the present invention provides an advantage over the prior art by evaluating the physical steps being taken by the test operator, translating them into a functional or behavior level and storing such information in a test case as test data. Furthermore, the test data may be presented in a test report and, due to the functionally intelligible nature of the test data description, thereby providing an informative and intuitive language through which test reports may be automatically or manually evaluated.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 3 depicts a simplified transaction definition and a corresponding test case for evaluating the functionality of the transaction, in accordance with a preferred embodiment of the present invention;

FIG. 5 depicts a test report describing the test data presented to the transaction and the results generated by the transaction, in accordance with the preferred embodiment of the present invention;

FIG. 6 depicts a difference report generated from the comparison of two test reports, in accordance with the preferred embodiment of the present invention; and FIGS. 7a and b depict a method for generating volume test data for regression testing of a transaction, in accordance with a preferred embodiment of the present invention.

DETAILED DESCRIPTION OF THE PREFERRED EMBODIMENTS

Figure 1:
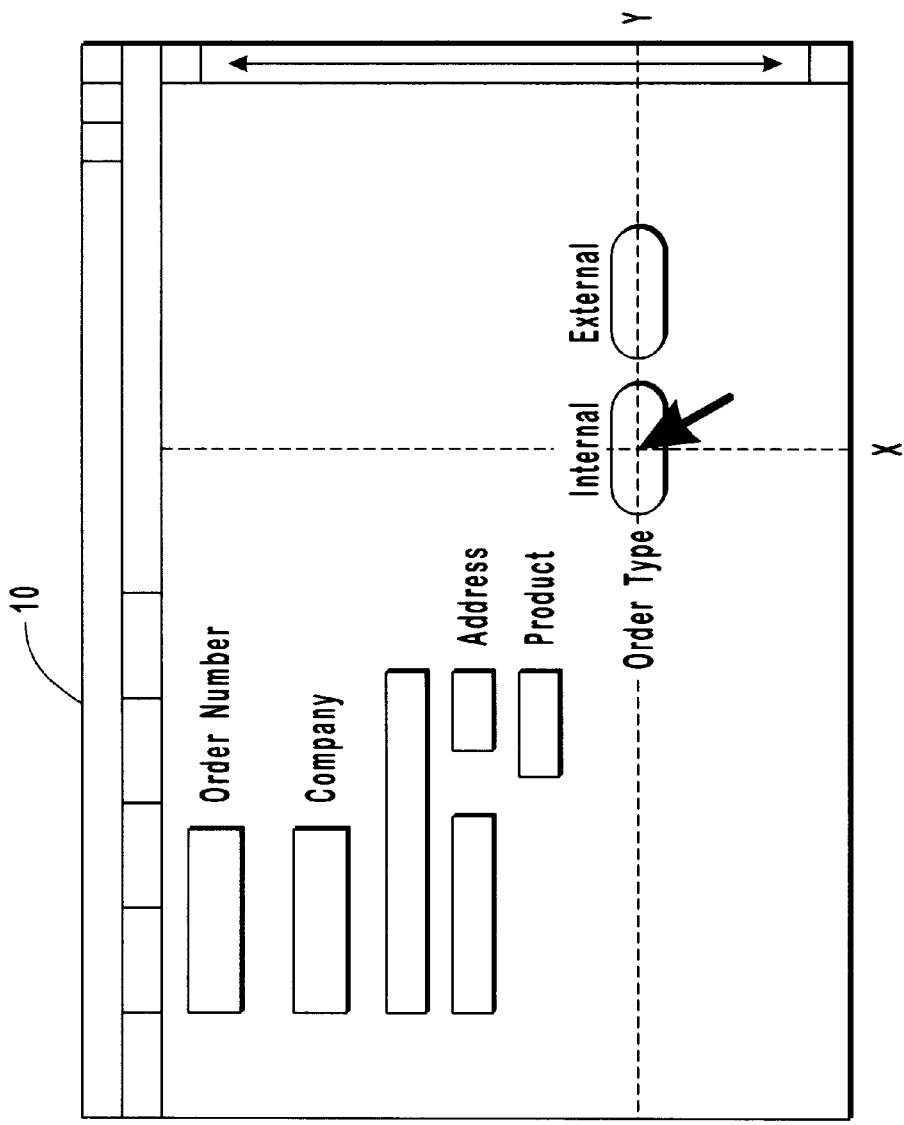
FIG. 1 depicts a frame displayed from a transaction and associated automation techniques, in accordance with the prior art.

While the shortcomings of the prior art have been discussed above, the present invention provides a method wherein an application designer may develop test data for verifying the operation of a transaction in a software application. Furthermore the test data, as implemented in the present invention, is preserved at a functional level accommodating changes to the transaction such as the moving of text fields to other locations within the frame or the changing of the presentation of particular fields from one form to another (e.g., the changing of a text entry field to a radio button group) without affecting the integrity of the test data. The preferred embodiment of the present invention employs a software tool, herein after referred to as the auto test module.

The auto test module contains several features and other modules that enable a transaction designer to both utilize test data in the testing of a transaction and perform other features aiding in the automatic or computer assisted creation of test data and test reports.

The method for regression testing of the present invention is embodied in the use and implementation of the auto test module. The auto test module is a software product that aids the transaction designer through the process of creating, using, maintaining and managing complete and thorough software application regression tests throughout each phase of an application development cycle. The present invention further provides a method for creating many regression tests automatically and defining additional ones with simple wysiwyg (what you see is what you get) interfaces. The auto test module of the present invention combines many features which advance the software development process by incorporating many features that automate the testing methodology. In general, when the regression test of the present invention is executed, the auto test module has a capability of generating data or may alternatively utilize data generated by a test operator or transaction designer who has initiated the appropriate keystrokes and mouse clicks to simulate the end-user use of the application. As an output to the regression testing of a transaction, the auto test module creates a test report that documents each simulated end-user interaction and each application or transaction response.

Furthermore, the end-user may also interactively review the test report to verify that the test ran as desired. Also, in keeping with the automated capability of the auto test module, another feature, discussed in more detail below, automatically compares the current test report with another control test report to either approve the test results or enumerate the differences in the test results.

While the auto test module is a global concept as described herein, it is important to define certain terms as used throughout the description of the present invention in order to maintain clarity. Such terms are defined as follows:

As used herein, the term "auto capture" refers to a component that facilitates the creation of test cases for transactions by monitoring the performance of the test in the transaction itself. That is to say, auto capture observes the behavior of the test operator and creates a test case that performs or replicates the same behavior.

As used herein, the term "auto compare" refers to a component that compares two test reports and produces a difference report therefrom. Additional capability is also included within the auto compare component enabling filtering or customization of the output generated in the difference report.

As used herein, the term "test report" refers to an output generated from the execution of a test case.

As used herein, the term "control test report" refers to a version of a test case's test report that contains the correct or favorable results. In the present invention, when a regression test is executed, the report resulting from the test case in question may be compared with an output defined as the control test report.

As used herein, the term "data maker" refers to a component that employs rules defined by a test operator to create volume test data for use in a thorough testing of a transaction.

As used herein, the term "difference report" refers to the output generated from the auto compare process. Such difference reports enumerate the differences between auto test reports including any filters invoked during the compare process.

As used herein, the term "radio group" refers to a graphical object that represents the possible values for a field generally depicted as a group of buttons presented within a frame and selectable by a mouse click.

As used herein, the term "regression test" refers to a repeatable test that thoroughly exercises the components it tests and produces output that, when analyzed, verifies the correctness of the component or transaction.

As used herein, the term "test case" refers to a defined set of inputs for a component or transaction that generates a defined set of outputs.

As used herein, the term "view" refers to groupings of data in a transaction that have many-to-one relationships between them.

Figure 2:
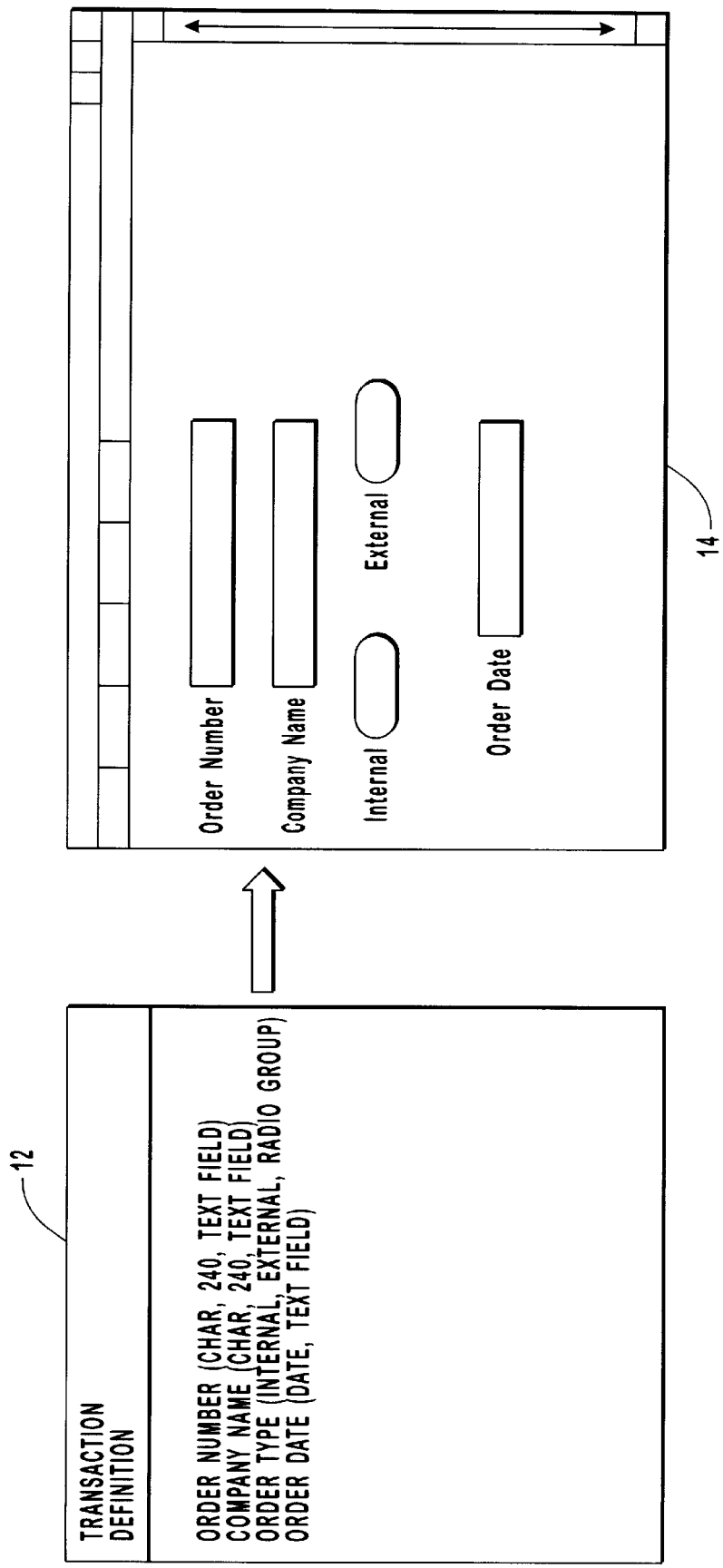
FIG. 2 depicts a transaction in a software application and a corresponding frame, in accordance with the present invention.

Transactions are typically defined as fundamental executable blocks for carrying out a specific task or function. A traditional transaction such as transaction 12 illustrated in FIG. 2 are defined as a series of fields having corresponding data types. FIG. 2 illustrates a typical transaction definition comprised of an order number, a company name, each being of the type "character" with an exemplary maximum length of 240 characters and having a display attribute of a textual field. Similarly, the order type field is defined as having a data type radio group with two alternatives either internal or external and a display attribute listed as a radio group commonly illustrated as selectable buttons. The order date field is of the type "date" and is defined as having a display attribute corresponding to a text field.

FIG. 2 further illustrates the transaction frame presented to the user of the application as frame 14. It should be noted that the order number field, customer name field and order date field are presented as text fields corresponding to the depiction attribute defined in the transaction definition. Likewise, the order type field is depicted as a radio group allowing the user to simply select one of the radio buttons. If such a transaction were to be tested using the methods in the prior art, a simple recording of the X/Y coordinates corresponding to the selections made by the test operator would be recorded. In such a prior art configuration, were the transaction designer to modify the transaction definition to change the order type field to a text field as opposed to a radio field, the test data associated with the regression test would become unusable due to its storage of the test case at a physical level corresponding to the X/Y coordinates of the original frame information presented.

In the present invention, however, the test data is stored at a functional level, therefore, rather than storing an X/Y coordinate for the selection of the order type, for example as being external, the test case test data of the present invention stores the test data at a functional level denoting, in this case, the selection of order type as being "external"." Such a storage of test information at an intermediate or function behavioral level is known in the present invention as test data. Furthermore, test data contains no information about the frame content or layout. Instead, test data contains the essence of a regression test and the auto test module determines how to execute that test case in a transaction at run-time. In the preferred embodiment, test data contains functions such as "add", "query", "modify", "erase", "show", or "choose." Therefore, the auto test module determines the transaction behaviors that such commands imply for each transaction and the test data simply contains a function, such as an add, and the associated data that makes up the test case. If such a function, modify for example, were to be tested using the methods of the prior art, a simple recording of mouse clicks to invoke the transaction, clicking a query button to indicate that a query is underway, entry of data to identify the correct instance, clicking a run query button to obtain the correct instance of data, and changing the data would be captured so that it could be played back to execute the test. By contrast, the autotest module understands the transaction style and is able to automatically determine based on style what actions to perform to do a modify. The auto test module thereafter determines the appropriate behavior to perform in the current version of the transaction undergoing testing. Since the test data contains no information about the current design of a transaction, the test cases still operate or execute when transaction changes are made by interacting with the field definitions.

Test data may consist of multiple lines of data for each test case. Each line is data that the auto test component enters into a single frame. FIG. 3 depicts a simplistic view of a transaction and the corresponding test case test data for performing the regression test on the exemplary transaction. In FIG. 3, transaction 16 is illustrated as an orders transaction which may be included within a larger application such as an order entry application. As illustrated in FIG. 3, the order transaction may be used to enter, examine and maintain orders. It should be pointed out that the order transaction references a set of data or a data set which may have multiple views such as an orders view, an orderlines view (i.e., a child of orders) and shipments view (i.e., a child of order lines). Each view presents its own frame in the transaction and, in the present example, the fields of transaction 16 are illustrated as customer name, order number and order date. While an actual transaction in a software application would be more complex, the present example is simplified and sufficient for the illustration at hand.

FIG. 3 further depicts a test case 18 comprised of test data capable of exercising transaction 16. Test case 18, tests the order transaction by adding an order, querying the order to make a change, modifying the order, requerying to verify the modification and erasing the added order which is subsequently verified by yet another query. In the present embodiment, test data is illustrated as comma-delimited text, however, other methods of delimiting and enumerating text are also equally valid and are also considered to be within the scope of the present invention. In the present embodiment, test case 18 is identified with a test case header which includes the test case name followed by the transaction to be tested by the test data. Each line of the test case, in the present embodiment, is enumerated with a line number followed by an action to be performed on the transaction as well as the values for fields that the auto test component enters or uses to complete the actions.

It should be reiterated that the auto test component lists field values in the test data lines without regard to the frame design or placement of fields within a displayed frame. Instead, the auto test component stores field values and the corresponding field. The auto test component thereafter uses the description of the transaction to convert the field values into the appropriate keystrokes and mouse clicks at test execution time, even if the field order changes.

As described above, the present embodiment utilizes six actions that may be performed upon a transaction in a test case. First, the "add" action tells the auto test component to create a new instance in the transaction using the data on the corresponding test data line. Secondly, the "query" action informs the auto test component to perform a query in the transaction using the data on the test data line as a query parameter into the data base. Thirdly, the "modify" action requests that the auto test component change an instance that is currently in the transaction. In accordance with the preferred embodiment of the present invention, the auto test component only changes the fields for which a data value is provided. Fourthly, the "erase" action requests that the auto test component erase an instance in a particular view of the transaction data set. Fifthly, the "choose" action informs the auto test component to scroll through a column box or click the next button to reach a particular instance in the transaction. Finally, the "show" action tells the auto test component to record in a test report the current layout and contents of a view in the transaction. An additional command, the "click" action, requests that the auto test component click the button with the label listed in the test data line. Also, a "menu" command tells the auto test component to invoke the menu item which has the menu prompts in the test data line.

Figure 4:
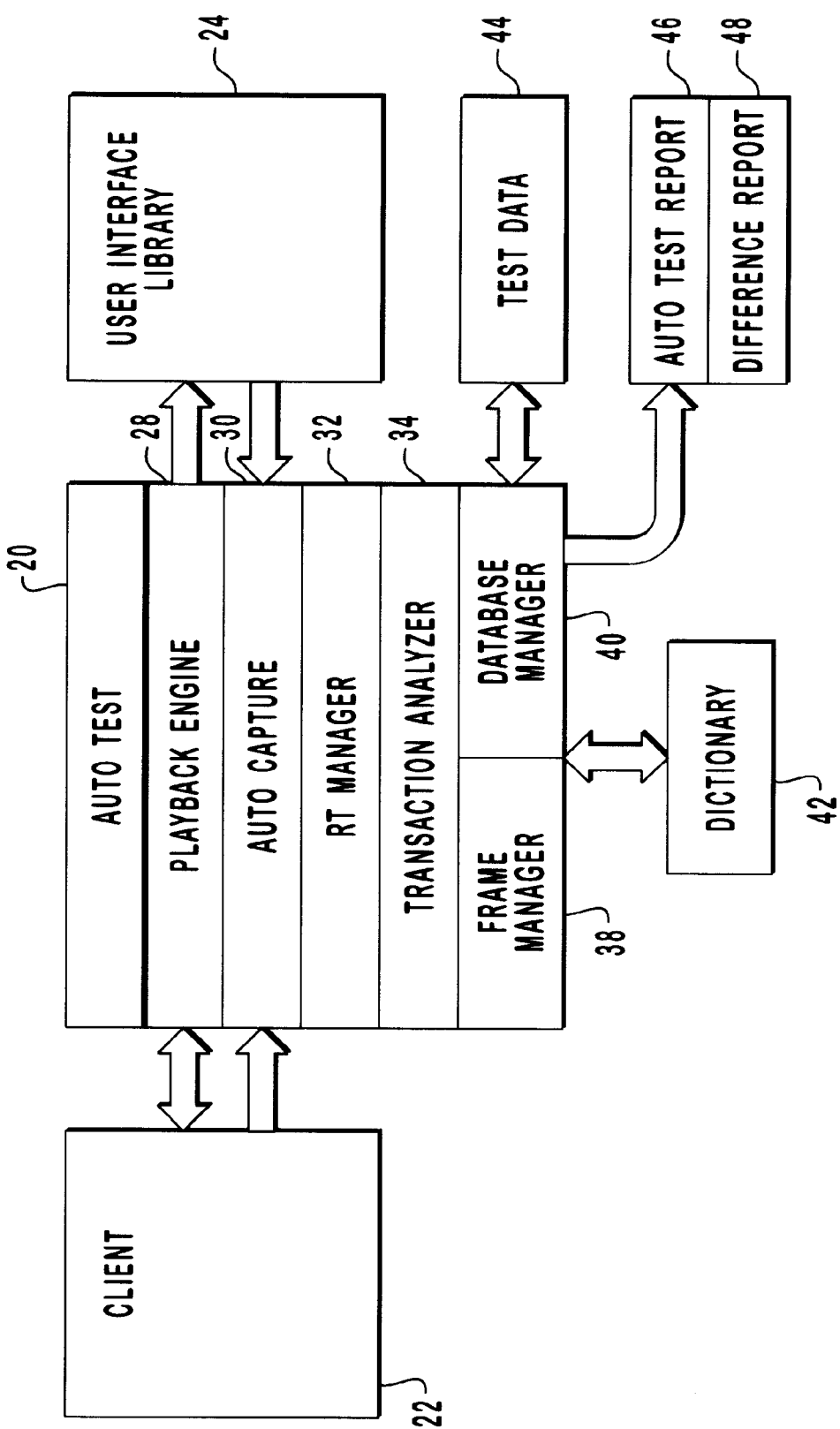
FIG. 4 is a simplified block diagram of the components of an automated testing environment, in accordance with the preferred embodiment of the present invention.

FIG. 4 is a high level block diagram of the components that comprise the auto test component, in accordance with the preferred embodiment of the present invention. In the preferred embodiment of the present invention, each of the components are designed using standard libraries to enhance portability and communicate one with another using APIs. Such an implementation enables the code associated with one layer to be changed or modified without affecting other layers by keeping the APIs consistent. Furthermore, such an implementation, or architecture enables different components to be developed or modified simultaneously.

Auto test component 20 consists of a plurality of elements that facilitate its overall execution. Test data 44, as described above, is data for testing in a functional format which the auto test module stores the regression test. For example, when auto test module 20 employs an auto capture module 30 (see below) or another test generator such as a transaction tester or a data maker module (see FIG. 4), auto test module 20 produces test data 44. Furthermore, when executing a regression test, auto test module 20 reads test data 44 and drives such test data into an event generator 26 (see below) or a playback engine 28 (see below). A brief description of a portion of the related components immediately follows, while more extensive descriptions follow the listing of brief descriptions.

Auto test module 20 produces a test report 46 (detailed in FIG. 5) as the output of each regression test run. Test report 46 describes the activity of the regression test and application responses.

A client 22 is any executable that controls the transactions being tested.

A frame manager component 38 provides a layer within auto test module 20 that calls a dictionary 42 to obtain layouts of each frame and determines the appropriate method for entering data into the frames such as whether the data entry method is through a radio group of buttons or through a text entry field.

A database manager 40 is the layer of auto test module 20 that interfaces with the database library to obtain transaction information from a dictionary 42 that describes the transactions that comprise the software application. Auto test module 20 uses such information in a transaction analyzer 34 to determine appropriate behaviors for performing test functionality within transactions. Transaction analyzer 34 is the layer of auto test module 20 that uses knowledge of a transaction structure, frame layout and behavior of test data functions such as the "add" function to determine the next keystroke or mouse activity to perform in a transaction undergoing testing.

An auto capture module 30 is the layer of auto test module 20 that observes the client 22 and the user interface activity to produce test data 44 that reproduces the observed activity.

A playback engine 28 provides the layer within auto test module 20 that takes keystroke activity and mouse clicks that transaction analyzer 34 derived and drives those events interactively into a session as cooperatively generated by user interface library 24 and client 22.

While the structural elements of auto test module 20 and other associated support or interactive modules have been briefly described above, the description that follows describes many of these elements in greater detail and with specificity. As discussed above, auto test module 20 utilizes test data 44 for implementing the test cases for use in regression testing. The test data stores the test case at a functional or behavior level as opposed to storing the test steps at a low or physical level. In order to generate test data, auto test module 20 provides five mechanisms that may be used to create tests: transaction tester, auto capture module 30, menu tester module, smart code tester module and data maker module. When any of these modules or mechanisms are used to develop test data, auto test module 20 produces an intermediate file called "test data" which contains a description of the regression test and its data. Auto test module 20 includes an engine that can run test data in batch mode without supervision or interactively in on-line transactions. As described above, auto test module 20 also produces output for each run of a regression test called a test report 46. Such an output describes test activity and application responses and may be automatically compared to a previous report or to a control report for the generation of a difference report 48.

Auto Capture

As described above, the quality of a software application depends on how extensively the application components or transactions are tested for completeness and correctness. In the present invention, the auto test module allows transaction designers to define tests by performing the test on the designed on-line transaction. That is to say, the auto test module observes the use of the on-line transaction and remembers the essence of the behavior that the transaction designer performed while interacting with the on-line transaction and re-performs that behavior at a future time on the transaction. Such a monitoring of a transaction designer's behavior or interaction with the transaction is performed by the auto capture module.

The auto capture module shortens the time it takes to create a regression test by allowing a transaction designer or transaction tester to execute the transaction thereby creating the regression tests. Therefore, transaction designers or transaction testers do not need to learn a separate mechanism or testing language to create regression tests in addition to understanding the operation of the transaction. The auto capture module furthermore creates the requisite sign-on and log-in procedures necessary for executing and bringing up in the displayed frame the transaction for which test data is being generated.

The auto capture module is initiated by entering an identifying file name designating the capture of the test operator actions into a specific test case. Such an identifier assumes the name of the test case desired to be created and may be further integrated into a regression test by specifying a regression test name. Auto capture module 30 monitors the physical actions which include the key strokes and mouse clicks performed by the test operator and, in conjunction with the transaction definition stored in the dictionary, transforms the physical actions into test data described at a functional level. Thereafter, auto capture module 30 stores the test data into a test case for execution in a regression test. In the preferred embodiment, the test data is stored in a database and likewise managed as database information. During a capturing session, the transaction operates within the client environment and the client passes functional descriptions resulting from physical actions taken by the test operator to auto test module 20 wherein capture module 30 transforms those functional requests into functional test data for storage within test data 44.

Play Back

The test case that is generated and stored as test data may alternatively be reviewed or rerun using play back engine 28. The play back option incrementally steps through an execution of a test case while allowing the test operator to view the activity and data of the online transaction undergoing testing. In the present embodiment, play back engine 28 may play back the test case in either a review mode or a rerun mode. In a review mode, the test case data and activity in the on-line transaction is displayed however the transaction is not re-exercised or re-executed but rather a step-by-step execution of the test data at the physical level is reviewed as requested by the test operator. In a rerun mode, the test case is actually re-executed with the auto test module showing the test case data and activity and simultaneously exercising the application or transaction functionality. In other embodiments of the present invention, additional functionality may be included within the play back feature such as the controlling of the play back speed to enable a user to manually view each of the executing steps and other features such as the inclusion of a stop or break point as well as a granularity adjustment for the number of execution steps to be performed prior to displaying the play back results. Play back engine 28 may further be utilized to edit a test case by playing back the test case and either selecting different data values for use in the test case or wholly erasing steps within the test case.

Test Reports

The auto test module enables a test operator to execute an automated repeatable test consisting of one or more test cases. When test date of a test case is executed, auto test module generates an output to determine whether each test case executed with the results from such an execution. The auto test module captures this output in a test report. Additionally, auto test module enables a comparison of the test report with another or previous test report and even facilitates the designation of a specific test report as a control test report utilized as a baseline for subsequent evaluation. Furthermore, the test data module may also generate a difference report resulting from discrepancies between a first test report and either a second or a control test report. In the preferred embodiment, the test report resulting from an execution of a test case assumes the same name as the test case or the test data within the test case. By reporting the execution steps of the test and the resulting test results in a test report, a test may be verified free from human error as a test operator is not required to manually observe the execution of the test and designate from personal observation the integrity of the test.

FIG. 5 depicts an exemplary test report. The test report is a series of sequential lines that describe the test case and the resulting application behavior. It should be pointed out that each line of the test report contains leading characters defining the name of the test case such that each test case has a unique identifying name followed by a sequence number of a transaction within a case. Those skilled in the art will appreciate that there can be many transactions within a test case depending upon the complexity of the test case and the application undergoing testing. The test case name and sequence number are followed by a line number of a line in the test report allowing each line to be uniquely identified for use in a difference report so that the location of the line number and test creating the discrepancy may be identified. In the preferred embodiment, test reports contain lines that are indented to more clearly communicate information and denote information related to the next higher level.

In the test report depicted in FIG. 5, the command "menu orders" results in the presentation of the "enter orders" transaction. The window resulting from the menu selection also displays the resulting information customer name "" with the other fields as presented such as "order number" "order date," "order type" with a radio button labeled "internal" (off) and a radio button "external" (off), and "query" and "cancel" buttons. The test report then displays corresponding test data wherein for line number 14, the value "IBM" was entered into the customer name field as well as in lines 15 and 16 the value "56530" was entered into the order number field and the value "Dec. 1, 1996" was entered into the order date field and the value "external" was entered into the order type field, respectively. Lines 17 through 20 display the resulting changes in the transaction due to the execution of the test data in lines 14 through 16. In line 17 the field "customer name" changed to include the value "IBM," the field order number changed to the value "56530,", the field "order date" changed to the value "Dec. 1, 1996", while under the description of order type the radio button "external" changed to a value of "on." As described above, the present invention also accommodates the designation of a particular test report as a control test report designating a testing baseline for subsequent evaluation of yet subsequent test reports. A test operator identifies a test report as a control test report against which future test reports are compared to determine that the software application or transaction undergoing testing is not regressing in its performance. Control test reports are designated after a test operator approves of the correct output or results and establishes the test report as a control test report, in the preferred embodiment, by associating a flag therewith designating a control test report.

Each time a test operator runs a regression test, the auto test module produces a current test report for that particular test run and may automatically compare that test report with a control test report. As a by product or result of the comparison of the two test reports, a difference report is generated. The difference report details differences between the test report and the control test report. While the difference report presents a description of the test data performed and the results from the test execution, the format of the difference report may also be filtered to report only certain differences thereby improving the comprehensibility of the difference report. FIG. 6 depicts a difference report which lists the names of the test reports compared and the filters applied as well as the differences between the two files. In the body of the difference report there are only three types of output in the preferred embodiment. The first type of output is a "missing" type which means that a line is missing from one test report that is present in the other. A second type or kind of designator in a difference report is an "extra" type which implies that a line is present in one test report and is missing from another. When the difference report designates two lines, a difference exists between a line that exists in both of the test reports. When two lines are present, one line is preceded by a "has" designator which means that one test report has a line that is different while the second designator, "not" identifies the line in the other test report from which it differs. It should be pointed out that in the body of the difference report each line or entry has either a "missing," extra" or "has" and "not" designator as well as a name, a test sequence number and a test report sequence number.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a software application, a method for regression testing a transaction using a test case comprised of test data wherein said test data describes said regression test at a functional level and executes said regression test at a physical level and further wherein said test data remains executable when a physical modification to said transaction occurs that changes a physical level of said transaction, said method for regression testing comprising the steps of:

(1) reading said test data of said test case described at said functional level;

(2) evaluating said transaction to determine test functionality corresponding to said test data;

(3) translating said test data into transaction events necessary to perform said test functionality as identified in said evaluating step; and (4) driving said transaction with said transaction events to execute said test data at said physical level.

2. The method for regression testing a transaction, as recited in claim 1, further comprising the step of reporting said transaction events and a response from said transaction in response to each of said transaction event in a current test report for evaluation of said regression test.

3. The method for regression testing a transaction, as recited in claim 2, further comprising the step of when said current test report exhibits favorable results, identifying said current test report as a control test report to designate a testing baseline for subsequent evaluation.

4. The method for regression testing a transaction, as recited in claim 3, further comprising the steps of:
   (1) on a subsequent initiation of said regression test, comparing said current test report with said control test report to determine differences from said regression test; and
   (2) when said differences exist, producing a difference report detailing differences between said current test report and said control test report.

5. The method for regression testing a transaction, as recited in claim 1, further comprising the step of automatically creating volume test data for use as said test data, including the steps of:
   (1) defining field constraints for transaction fields within said transaction;
   (2) specifying an amount of said volume test data to be generated; and
   (3) generating said volume test data for use in said regression test of said transaction.

6. The method for regression testing a transaction, as recited in claim 1, further comprising the step creating test data for use in said regression test from execution of said transaction, including the steps of:
   (1) entering an identifier of said test case;
   (2) capturing physical actions performed by a user of said transaction;
   (3) transforming said physical actions into said test data described at said functional level; and
   (4) storing said test data into a test case for execution in said regression test.

7. The method for regression testing a transaction, as recited in claim 2, further comprising the step of reviewing step-by-step execution of said test data at said physical level following the execution of said test case.

8. The method for regression testing a transaction, as recited in claim 1, further comprising the step of rerunning said transaction with said transaction events in a step-by-step execution of said test data at said physical level following the initial execution of said test case.

9. A computer readable medium having computer-executable instructions for regression testing a transaction using a test case comprised of test data wherein said test data describes said regression test at a functional level and executes said regression test at a physical level and further wherein said test data remains executable when a physical modification to said transaction occurs that changes a physical level of said transaction, said computer-executable instructions for performing the steps of:
   (1) reading said test data of said test case described at said functional level;
   (2) evaluating said transaction to determine test functionality corresponding to said test data;
   (3) translating said test data into transaction events necessary to perform said test functionality as identified in said evaluating step; and
   (4) driving said transaction with said transaction events to execute said test data at said physical level.

10. The computer-readable medium of claim 9 having further computer-executable instructions for performing the step of reporting said transaction events and a response from said transaction in response to said transaction event in a current test for evaluation of said regression test.

11. The computer-readable medium of claim 10 having further computer-executable instructions for performing the step of when said first report exhibits favorable results, storing said first report as a control report to designate a testing baseline for subsequent evaluation.

12. The computer-readable medium of claim 11 having further computer-executable instructions for performing the step of:
   (1) on a subsequent initiation of said regression test, comparing said current test report with said control test report to determine differences from said regression test; and
   (2) when said differences exist, producing a difference report detailing differences between said current test report and said control test report.

13. The computer-readable medium of claim 9 having further computer-executable instructions for performing the step of automatically creating volume test data for use as said test data, including computer-executable instructions for performing the steps of:
   (1) defining field constraints for transaction fields within said transaction;
   (2) specifying an amount of said volume test data to be generated; and
   (3) generating said volume test data for use in said regression test of said transaction.

14. The computer-readable medium of claim 9 having further computer-executable instructions for performing the step of creating test data for use in said regression test from execution of said transaction, including computer-executable instructions for performing the steps of:
   (1) entering an identifier of said test case;
   (2) capturing physical actions performed by a user of said transaction;
   (3) transforming said physical actions into said test data described at said functional level; and
   (4) storing said test data into a test case for execution in said regression test.

15. The computer-readable medium of claim 9 having further computer-executable instructions for performing the step of reviewing step-by-step execution of said test data at said physical level following the execution of said test case.

16. The computer-readable medium of claim 9 having further computer-executable instructions for performing the step of rerunning said transaction with said transaction events in a step-by-step execution of said test data at said physical level following the initial execution of said test case.

17. In a software application, a method for defining a regression test case for a transaction wherein said test case remains executable when physical modifications to said transaction occur, said method comprising the steps of:
   (1) observing at a physical level a physical test step requested of said transaction;
   (2) evaluating said transaction to determine corresponding test functionality resulting from said physical test step;
   (3) transforming said physical test step into a functional test data corresponding to said transaction functionality; and (4) storing said functional test data in said test case.

18. The method for defining a regression test case for a transaction wherein said test case remains executable when physical modifications to said transaction occur, as recited in claim 17, wherein said storing step further comprises the steps of:
(1) entering an identifier of said test case;
(2) storing said functional test data in said test case; and
(3) storing a data value for use by said functional test data in performing said transaction functionality.

19. A computer-readable medium having a plurality of data fields stored on the medium and representing a data structure, comprising:
(1) computer usable code means defining a first identification field representing a test case identifier for designating a specific portion of a regression test for use in testing a transaction within a software application; and
(2) computer usable code means defining at least one test data field to hold at least one test data that describe said regression test at a functional level and executes said regression test at a physical level and wherein said at least one test data remains executable when a physical modification to said transaction.

20. The computer-readable medium having a plurality of data fields, as recited in claim 19, wherein said first identification field further comprises a second identification field representing an identifier designating a specific transaction for testing by said test case.

* * * * *